US012612053B2

(10) Patent No.: US 12,612,053 B2

(45) Date of Patent: Apr. 28, 2026

(12) United States Patent

Sharma et al.

(54) VEHICLE INTERIOR PERSONALIZATION BASED ON EMOTIONAL STATE

(71) Applicant: GM Global Technology Operations LLC, Detroit, MI (US)

(72) Inventors: Manoj Kumar Sharma, Troy, MI (US); Akilesh Rajavenkatanarayanan, Macomb, MI (US); Joseph F. Szczerba, Grand Blanc, MI (US); Edward R. Gundlach, West Bloomfield, MI (US); Maureen Elizabeth August, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 18/408,943

(22) Filed: Jan. 10, 2024

(65) Prior Publication Data

US 2025/0222937 A1 Jul. 10, 2025

(51) Int. Cl.
B60W 50/00 (2006.01)
G06V 10/70 (2022.01)
(Continued)

(52) U.S. Cl.
CPC ......... B60W 50/0098 (2013.01); G06V 10/70 (2022.01); G06V 20/59 (2022.01);
(Continued)

(58) Field of Classification Search
CPC ....... B60W 50/0098; B60W 2420/403; B60W 2420/54; B60W 2540/22;
(Continued)

(56) References Cited

U.S. PATENT DOCUMENTS

2007/0182532 A1 * 8/2007 Lengning ............. G10H 1/0041
340/439
2015/0274063 A1 * 10/2015 Farah ....................... B60Q 1/00
340/457
(Continued)

FOREIGN PATENT DOCUMENTS

CN 114422920 A * 4/2022 ............. H04R 5/033
EP 2256967 A1 * 12/2010 ............. H04H 60/27
(Continued)

OTHER PUBLICATIONS

Kurczewski, N. "Ford Suggests You Take a Coffee Break," Road & Track, Oct. 31, 2011, https://www.roadandtrack.com/new-cars/car-technology/news/a3303/ford-suggests-you-take-a-coffee-break-27814/.
(Continued)

*Primary Examiner* — Erin M Piateski
*Assistant Examiner* — Ashley Tiffany Schoech
(74) *Attorney, Agent, or Firm* — Vivacqua Crane, PLLC

(57) ABSTRACT

A system for interior personalization for a vehicle includes one or more vehicle sensors. The system further may include one or more vehicle interior environmental control devices. The system further may include a controller in electrical communication with the one or more vehicle sensors and the one or more vehicle interior environmental control devices. The controller is programmed to perform one or more measurements using the one or more vehicle sensors. The controller is further programmed to identify an emotional status of an occupant of the vehicle based at least in part on the one or more measurements. The controller is further programmed to adjust one or more operating parameters of the one or more vehicle interior environmental control devices based at least in part on the emotional status of the occupant.

18 Claims, 2 Drawing Sheets

(51) Int. Cl.
    _G06V 20/59_         (2022.01)
    _G06V 40/16_         (2022.01)
    _G10L 25/63_         (2013.01)

(52) U.S. Cl.
    CPC ............. _G06V 40/174_ (2022.01); _G10L 25/63_
        (2013.01); _B60W 2420/403_ (2013.01); _B60W_
        _2420/54_ (2013.01); _B60W 2540/22_ (2013.01);
                                _B60W 2540/221_ (2020.02)

(58) Field of Classification Search
    CPC ..... B60W 2540/221; B60W 2540/225; B60W
                2540/229; B60W 2540/24; B60W
            2540/26; B60W 2540/21; B60W 60/0013;
                G06V 10/70; G06V 10/74; G06V 20/59;
                    G06V 20/597; G06V 40/174; G06V
                    40/16; G06V 40/175; G06V 40/176;
                                            G10L 25/63
    See application file for complete search history.

(56)                References Cited

U.S. PATENT DOCUMENTS

2017/0262256 A1 *   9/2017   Rajendran ............... G10L 25/63
2018/0061415 A1 *   3/2018   Penilla .................... G10L 15/02
2018/0174457 A1 *   6/2018   Taylor ...................... G06N 3/09
2018/0285641 A1 *   10/2018  Yan ......................... G06V 20/20
2019/0049957 A1 *   2/2019   Healey ................... B60W 40/08
2021/0006866 A1 *   1/2021   Chu ....................... G06N 20/00
2021/0261050 A1 *   8/2021   Sobhany .................. B60Q 3/80
2023/0377601 A1    11/2023   Nimmagadda et al.
2024/0132081 A1     4/2024   Levy et al.
2024/0157896 A1     5/2024   Gangumalla et al.
2024/0157954 A1     5/2024   Adiththan et al.
2024/0239349 A1     7/2024   Degani et al.
2025/0182319 A1 *   6/2025   Satoi ........................ G06T 7/70

FOREIGN PATENT DOCUMENTS

JP          2016191602 A  *  11/2016
KR          102196380 B1  *  12/2020   .......... G06V 40/175

OTHER PUBLICATIONS

Nissan Motor Co. "Nissan's "Driver Attention Alert" Helps Detect
Erratic Driving Caused By Drowsiness and Inattention," press
release, Apr. 1, 2015, https://usa.nissannews.com/en-US/releases/
nissan-s-driver-attention-alert-helps-detect-erratic-driving-caused-
by-drowsiness-and-inattention.

* cited by examiner

VEHICLE INTERIOR PERSONALIZATION BASED ON EMOTIONAL STATE

INTRODUCTION

The present disclosure relates to interior control systems for vehicles, and more particularly to an interior control setting system which actuates a vehicle component based on an emotional state of an occupant within the vehicle.

Modern vehicles include a human-machine Interface (HMI) (e.g., a center dashboard touch screen) that can be manually operated by an occupant to adjust the settings of one or more interior vehicle systems. For example, the occupant may operate the touch screen display to access a menu with interior control settings for an automatic door lock system (based on vehicle speed, shifting from park, or the like), an automatic door unlock system (based on vehicle speed, shifting to park, or the like), key fob operation (e.g., press unlock once to unlock only the driver's door and twice to unlock all doors, or the like), automatic re-lock timer, lock/unlock feedback tone, automatic seat temperature, headlights automatic on sensitivity, headlights automatic shut-off timer, daytime running light activation, interior lights automatic shut-off timer, exterior lights automatic shut-off timer, and/or the like. While these vehicles permit an occupant to manually customize various vehicle control settings, these vehicles do not automatically adjust those settings based on any criteria or conditions.

Thus, while existing vehicle systems with control settings achieve their intended purpose, there is a need for a new and improved system and method for interior personalization for a vehicle.

SUMMARY

According to several aspects, a system for interior personalization for a vehicle is provided. The system may include one or more vehicle sensors. The system further may include one or more vehicle interior environmental control devices. The system further may include a controller in electrical communication with the one or more vehicle sensors and the one or more vehicle interior environmental control devices. The controller is programmed to perform one or more measurements using the one or more vehicle sensors. The controller is further programmed to identify an emotional status of an occupant of the vehicle based at least in part on the one or more measurements. The controller is further programmed to adjust one or more operating parameters of the one or more vehicle interior environmental control devices based at least in part on the emotional status of the occupant.

In another aspect of the present disclosure, the one or more vehicle sensors include at least an interior camera. To perform the one or more measurements, the controller is further programmed to capture one or more images of a face of the occupant using the interior camera.

In another aspect of the present disclosure, the one or more vehicle sensors includes at least an interior microphone. To perform the one or more measurements, the controller is further programmed to capture one or more voice recordings of the occupant using the interior microphone.

In another aspect of the present disclosure, the one or more vehicle sensors includes at least a biometric sensor. To perform the one or more measurements, the controller is further programmed to perform one or more biometric measurements of the occupant using the biometric sensor.

The biometric sensor includes at least one of: a respiration rate sensor, a heart rate sensor, and a galvanic skin response sensor.

In another aspect of the present disclosure, to identify the emotional status of the occupant, the controller is further programmed to execute an emotion identification machine learning algorithm. The emotion identification machine learning algorithm is configured to receive the one or more images, the one or more voice recordings, and the one or more biometric measurements as an input and provide the emotional status of the occupant as an output. The emotional status of the occupant includes one of: a negative occupant emotional status and a positive occupant emotional status.

In another aspect of the present disclosure, the controller is further programmed to identify the positive occupant emotional status based on the one or more measurements using the emotion identification machine learning algorithm. The controller is further programmed to determine a current state of the one or more operating parameters of the one or more vehicle interior environmental control devices in response to identifying the positive occupant emotional status. The controller is further programmed to save a mood matching state of the one or more operating parameters of the one or more vehicle interior environmental control devices in a non-transitory memory of the controller. The mood matching state is equal to the current state of the one or more operating parameters.

In another aspect of the present disclosure, the one or more vehicle interior environmental control devices further includes an interior ambient lighting system. To adjust the one or more operating parameters, the controller is further programmed to adjust one or more operating parameters of the interior ambient lighting system to improve the emotional status of the occupant in response to determining that the emotional status of the occupant is the negative occupant emotional status. To adjust the one or more operating parameters, the controller is further programmed to adjust one or more operating parameters of the interior ambient lighting system based at least in part on the mood matching state to match the emotional status of the occupant in response to determining that the emotional status of the occupant is the positive occupant emotional status.

In another aspect of the present disclosure, the one or more vehicle interior environmental control devices further includes an infotainment system. To adjust the one or more operating parameters, the controller is further programmed to adjust one or more operating parameters of the infotainment system to improve the emotional status of the occupant in response to determining that the emotional status of the occupant is the negative occupant emotional status. The one or more operating parameters of the infotainment system includes at least one of: a music playback volume and a music playback genre. To adjust the one or more operating parameters, the controller is further programmed to adjust one or more operating parameters of the infotainment system based at least in part on the mood matching state to match the emotional status of the occupant in response to determining that the emotional status of the occupant is the positive occupant emotional status.

In another aspect of the present disclosure, to adjust the one or more operating parameters, the controller is further programmed to adjust one or more operating parameters of the infotainment system to improve the emotional status of the occupant in response to determining that the emotional status of the occupant is the negative occupant emotional status. The one or more operating parameters of the infotainment system includes at least one of: a navigation system selected route and a navigation system selected destination.

In another aspect of the present disclosure, to adjust the one or more operating parameters, the controller is further programmed to adjust one or more operating parameters of at least one of: a heating, ventilation, and air conditioning (HVAC) system, a seat massage system, and an interior aroma system to improve the emotional status of the occupant in response to determining that the emotional status of the occupant is the negative occupant emotional status. To adjust the one or more operating parameters, the controller is further programmed to adjust one or more operating parameters of the HVAC system, the seat massage system, and the interior aroma system based at least in part on the mood matching state to match the emotional status of the occupant in response to determining that the emotional status of the occupant is the positive occupant emotional status.

According to several aspects, a method for interior personalization for a vehicle is provided. The method may include performing one or more measurements using one or more vehicle sensors. The method further may include identifying an emotional status of an occupant of the vehicle based at least in part on the one or more measurements. The method further may include adjusting one or more operating parameters of one or more vehicle interior environmental control devices based at least in part on the emotional status of the occupant.

In another aspect of the present disclosure, performing the one or more measurements further may include capturing one or more images of a face of the occupant using an interior camera. Performing the one or more measurements further may include capturing one or more voice recordings of the occupant using an interior microphone. Performing the one or more measurements further may include performing one or more biometric measurements of the occupant using a biometric sensor. The biometric sensor includes at least one of: a respiration rate sensor, a heart rate sensor, and a galvanic skin response sensor.

In another aspect of the present disclosure, identifying the emotional status of the occupant further may include executing an emotion identification machine learning algorithm. The emotion identification machine learning algorithm is configured to receive the one or more images, the one or more voice recordings, and the one or more biometric measurements as an input and provide the emotional status of the occupant as an output. The emotional status of the occupant includes one of: a negative occupant emotional status and a positive occupant emotional status.

In another aspect of the present disclosure, the method further includes identifying the positive occupant emotional status based on the one or more measurements using the emotion identification machine learning algorithm. The method further includes determining a mood matching state of the one or more operating parameters of the one or more vehicle interior environmental control devices in response to identifying the positive occupant emotional status.

In another aspect of the present disclosure, adjusting the one or more operating parameters further may include adjusting one or more operating parameters of an interior ambient lighting system to improve the emotional status of the occupant in response to determining that the emotional status of the occupant is the negative occupant emotional status. Adjusting the one or more operating parameters further may include adjusting one or more operating parameters of the interior ambient lighting system based at least in part on the mood matching state to match the emotional status of the occupant in response to determining that the emotional status of the occupant is the positive occupant emotional status.

In another aspect of the present disclosure, adjusting the one or more operating parameters further may include adjusting one or more operating parameters of an infotainment system to improve the emotional status of the occupant in response to determining that the emotional status of the occupant is the negative occupant emotional status. The one or more operating parameters of the infotainment system includes at least one of: a music playback volume, a music playback genre, a navigation system selected route, and a navigation system selected destination. Adjusting the one or more operating parameters further may include adjusting one or more operating parameters of the infotainment system based at least in part on the mood matching state to match the emotional status of the occupant in response to determining that the emotional status of the occupant is the positive occupant emotional status.

In another aspect of the present disclosure, adjusting the one or more operating parameters further may include adjusting one or more operating parameters of at least one of: a heating, ventilation, and air conditioning (HVAC) system, a seat massage system, and an interior aroma system to improve the emotional status of the occupant in response to determining that the emotional status of the occupant is the negative occupant emotional status. Adjusting the one or more operating parameters further may include adjusting one or more operating parameters of the HVAC system, the seat massage system, and the interior aroma system based at least in part on the mood matching state to match the emotional status of the occupant in response to determining that the emotional status of the occupant is the positive occupant emotional status.

According to several aspects, a system for interior personalization for a vehicle is provided. The system may include one or more vehicle sensors. The one or more vehicle sensors includes at least one of: an interior camera, an interior microphone, and a biometric sensor. The system further may include one or more vehicle interior environmental control devices. The one or more vehicle interior environmental control devices includes at least one of: an interior ambient lighting system, an infotainment system, a heating, ventilation, and air conditioning (HVAC) system, a seat massage system, and an interior aroma system. The system further may include a controller in electrical communication with the one or more vehicle sensors and the one or more vehicle interior environmental control devices. The controller is programmed to perform one or more measurements using the one or more vehicle sensors. The one or more measurements includes at least one of: one or more images of a face of an occupant, one or more voice recordings of the occupant, and one or more biometric measurements of the occupant. The controller is further programmed to execute an emotion identification machine learning algorithm. The emotion identification machine learning algorithm is configured to receive the one or more images, the one or more voice recordings, and the one or more biometric measurements as an input and provide an emotional status of the occupant as an output. The emotional status of the occupant includes one of: a negative occupant emotional status and a positive occupant emotional status. The controller is further programmed to adjust one or more operating parameters of the one or more vehicle interior environmental control devices based at least in part on the emotional status of the occupant.

In another aspect of the present disclosure, the controller is further programmed to identify the positive occupant emotional status based on the one or more measurements using the emotion identification machine learning algorithm. The controller is further programmed to determine a current state of the one or more operating parameters of the one or more vehicle interior environmental control devices in response to identifying the positive occupant emotional status. The controller is further programmed to save a mood matching state of the one or more operating parameters of the one or more vehicle interior environmental control devices in a non-transitory memory of the controller. The mood matching state is equal to the current state of the one or more operating parameters.

In another aspect of the present disclosure, to adjust the one or more operating parameters of the one or more vehicle interior environmental control devices, the controller is further programmed to adjust one or more operating parameters of the one or more vehicle interior environmental control devices to improve the emotional status of the occupant in response to determining that the emotional status of the occupant is the negative occupant emotional status. To adjust the one or more operating parameters of the one or more vehicle interior environmental control devices, the controller is further programmed to adjust one or more operating parameters of the one or more vehicle interior environmental control devices based at least in part on the mood matching state to match the emotional status of the occupant in response to determining that the emotional status of the occupant is the positive occupant emotional status.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, occupant emotional status (i.e., mood) may affect occupant comfort and enjoyment when operating and/or riding in a vehicle. Furthermore, negative mood may be associated with an increased risk of motor vehicle accidents. In aspects of the present disclosure, vehicles may include systems operable to increase comfort and improve occupant emotional status. However, such systems must be manually activated by the occupant. Therefore, the present disclosure provides a new and improved system and method for interior personalization for a vehicle including automatic identification of occupant emotional status and adjustment of one or more operating parameters of one or more vehicle interior environmental control devices.

Figure 1:
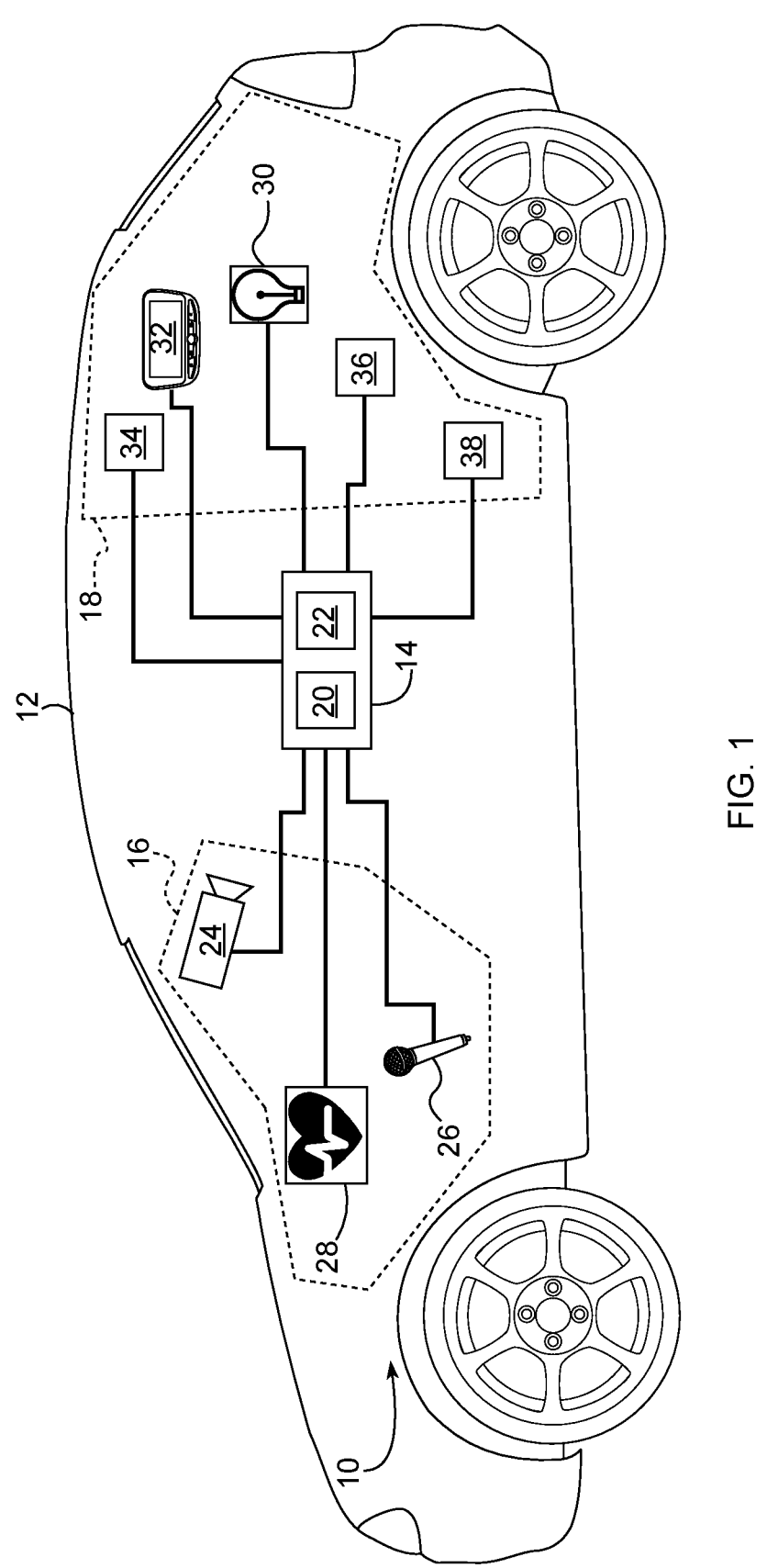
FIG. 1 is a schematic diagram of a system for interior personalization for a vehicle, according to an exemplary embodiment.

Referring to FIG. 1, a system for interior personalization for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, one or more vehicle sensors 16, and one or more vehicle interior environmental control devices 18.

The controller 14 is used to implement a method 100 for interior personalization for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or nonvolatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the one or more vehicle sensors 16 and the one or more vehicle interior environmental control devices 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The one or more vehicle sensors 16 are used to acquire information about an occupant of the vehicle 12. In the scope of the present disclosure, the occupant includes, in a non-limiting example, a driver, a passenger, and/or any additional persons in the vehicle 12. In an exemplary embodiment, the one or more vehicle sensors 16 include an interior camera 24, an interior microphone 26, and a biometric sensor 28.

In another exemplary embodiment, the one or more vehicle sensors 16 further includes sensors to determine information about an environment within the vehicle 12. In a non-limiting example, the one or more vehicle sensors 16 further includes a seat occupancy sensor, an interior air temperature sensor, an interior motion detection sensor, and/or the like. It should be understood that the one or more vehicle sensors 16 may include various additional sensors operable to determine information about the occupant and/or the environment within the vehicle 12.

The interior camera 24 is used to capture images and/or videos of the occupant within the vehicle 12. In a non-limiting example, the interior camera 24 is used to capture one or more images of a face of the occupant, as will be discussed in greater detail below. In an exemplary embodiment, the interior camera 24 is a photo and/or video camera which is positioned to view an interior cabin of the vehicle 12. In an exemplary embodiment, the interior camera 24 is in a headliner or dashboard of the vehicle 12, having a view of one or more front seats of the vehicle 12. In another exemplary embodiment, the interior camera 24 is affixed in a rear passenger compartment of the vehicle 12, having a view of one or more rear seats of the vehicle 12. In another exemplary embodiment, the interior camera 24 includes multiple cameras positioned throughout the interior cabin of the vehicle 12. In another exemplary embodiment, the interior camera 24 is part of a driver monitoring system (DMS) operable to monitor an attention level of the occupant. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The interior microphone 26 is used to capture voice recordings of the occupant within the vehicle 12. In an exemplary embodiment, the interior microphone 26 includes a unidirectional dynamic microphone (i.e., a microphone which converts acoustic waves to electrical signals using electromagnetic induction) configured to capture voice recordings from a specific occupant of the vehicle 12. In another exemplary embodiment, the interior microphone 26 includes a plurality of microelectromechanical systems (MEMS) microphones (e.g., a microphone having a pressure-sensitive diaphragm etched directly into a silicon wafer) disposed throughout the interior cabin of the vehicle 12 configured to capture voice recordings. It should be understood that additional types of microphones which are configured to convert acoustic waves to electrical signals (e.g., digital and/or analog electrical signals) are included in the scope of the present disclosure.

The biometric sensor 28 is used to perform biometric measurements of the occupant. In the scope of the present disclosure, biometric measurements include, for example, respiration rate, heart rate, galvanic skin response, blood oxygen, body temperature, pupil dilation, brain activity, and/or the like. In an exemplary embodiment, the biometric sensor 28 includes at least one of: a respiration rate sensor, a heart rate sensor, a galvanic skin response sensor, an electroencephalography (EEG) sensor, and/or the like.

In a non-limiting example, the respiration rate sensor is used to measure a respiration (i.e., breathing) rate of the occupant. In an exemplary embodiment, the respiration rate sensor is a pneumograph affixed to a chest or abdomen of the occupant. In another exemplary embodiment, the respiration rate sensor is a non-contact, infrared respiration rate sensor affixed within the vehicle 12. In an exemplary embodiment, variations in respiration rate may be associated with emotional status of the occupant. For example, an increased respiration rate may indicate negative emotions such as stress or anger.

In a non-limiting example, the heart rate sensor is used to measure a heart rate of the occupant. In an exemplary embodiment, the heart rate sensor is an electrical sensor operable to detect a bio-electrical potential generated by electrical signals which control the expansion and contraction of heart chambers. In another exemplary embodiment, the heart rate sensor is an optical sensor which uses light-based technology to measure a blood volume conveyed by the heart's pumping action. In a non-limiting example, the heart rate sensor is disposed within a seat, armrest, steering wheel, and/or other surface typically in contact with the occupant within the vehicle 12. In an exemplary embodiment, variations in heart rate may be associated with emotional status of the occupant. For example, an increased heart rate may indicate negative emotions such as stress or anger.

In a non-limiting example, the galvanic skin response sensor is used to measure a skin conductivity of the occupant. In an exemplary embodiment, the galvanic skin response sensor is an electrical sensor operable to measure an electrical conductance between multiple electrodes in contact with the occupant's skin. In a non-limiting example, the galvanic skin response sensor is disposed within a seat, armrest, steering wheel, and/or other surface typically in contact with the occupant within the vehicle 12. In an exemplary embodiment, variations in skin conductivity (i.e., galvanic skin response) may be associated with emotional status of the occupant. For example, an increased skin conductance may indicate negative emotions such as stress, anger, or anxiety.

In a non-limiting example, the EEG sensor is used to measure brain wave activity of the occupant. In a non-limiting example, the EEG sensor is disposed within a headrest of the vehicle 12. In an exemplary embodiment, different patterns of brain waves may be associated with emotional status of the occupant.

The one or more vehicle interior environmental control devices 18 are used to adjust an environment within the interior cabin of the vehicle 12. In an exemplary embodiment, the one or more vehicle interior environmental control devices 18 are controlled by one or more operating parameters. In the scope of the present disclosure, operating parameters are settings which control the operation of a device, including, for example, an enablement state of the device. In a non-limiting example, the operating parameters of each of the one or more vehicle interior environmental control devices 18 are controllable by the controller 14. In an exemplary embodiment, the one or more vehicle interior environmental control devices 18 include an interior ambient lighting system 30, an infotainment system 32, a heating, ventilation, and air conditioning (HVAC) system 34, a seat massage system 36, and an interior aroma system 38.

The interior ambient lighting system 30 is used to provide illumination within the interior cabin of the vehicle 12. In an exemplary embodiment, the interior ambient lighting system 30 includes one or more light sources (e.g., light-emitting diodes, incandescent lights, electroluminescent lights, and/or the like) disposed within the interior cabin of the vehicle 12. In a non-limiting example, the light sources are disposed within or on a door panel of the vehicle 12, a footwell of the vehicle 12, a seat of the vehicle 12, a dashboard of the vehicle 12, and/or the like. In an exemplary embodiment, the light sources are operable to provide illumination in one or more colors. In an exemplary embodiment, the controller 14 may control one or more operating parameters of the interior ambient lighting system 30, including, for example, an activation state, a brightness, a color, an animation, and/or a location of illuminated light sources of the interior ambient lighting system 30.

The infotainment system 32 is used to provide information and entertainment to the occupant and/or to provide vehicle control capabilities to the occupant. In an exemplary embodiment, the infotainment system 32 includes a human-machine interface (HMI), a sound system, and a navigation system. The HMI is used to provide information to the occupant of the vehicle 12. In an exemplary embodiment, the HMI is a display located in view of the occupant and capable of displaying text, graphics and/or images. It is to be understood that HMI display systems including LCD displays, LED displays, and the like are within the scope of the present disclosure. Further exemplary embodiments where the HMI is disposed in a rearview mirror are also within the scope of the present disclosure.

In another exemplary embodiment, the HMI includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the HMI includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In a non-limiting example, the controller 14 may control one or more operating parameters of the HMI, including, for example, a display brightness, a display color, a display notification, and/or the like.

In an exemplary embodiment, the occupant may interact with the infotainment system 32 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure.

The sound system is used to provide entertainment to the occupant within the interior cabin of the vehicle 12. In a non-limiting example, the sound system includes an amplifier and one or more loudspeakers. The sound system is operable to play sounds such as, for example, music, for entertainment of the occupant. In a non-limiting example, the sounds are provided to the amplifier from various sources, including, for example, a portable media device, an MP3 player, a smartphone, an internet connection, an AM/FM radio receiver, and/or the like. In an exemplary embodiment, the sound system is controllable by the occupant via the infotainment system 32, for example, by interaction with the HID, as discussed above. Furthermore, the controller 14 may adjust one or more operating parameters (e.g., a music playback volume, a music playback genre, and/or the like) of the sound system via electrical communication with the infotainment system 32, as will be discussed in greater detail below.

The navigation system is used to provide the occupant with information about navigation routes and destinations while operating the vehicle 12. In an exemplary embodiment, the navigation system includes a global navigation satellite system (GNSS). The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS. It should be understood that various additional types of satellite-based radionavigation systems, such as, for example, the Global Positioning System (GPS), Galileo, GLONASS, and the BeiDou Navigation Satellite System (BDS) are within the scope of the present disclosure.

Based on the geographical location of the vehicle and the map information obtained from the GNSS, the navigation system calculates an optimal route to a destination selected by the occupant. In an exemplary embodiment, the navigation system is controllable by the occupant for selection of destination and route parameters via the infotainment system 32, for example, by interaction with the HID, as discussed above. Furthermore, the controller 14 may adjust one or more operating parameters (e.g., destination and/or route parameters) of the navigation system via electrical communication with the infotainment system 32, as will be discussed in greater detail below.

The HVAC system 34 is used to control airflow within the interior cabin of the vehicle 12. The HVAC system 34 is used to improve driver comfort by regulating temperature and humidity inside of the vehicle 12. In an exemplary embodiment, the HVAC system 34 includes a blower, air baffles, a temperature control, and HVAC outlets. The blower is an electrically driven fan which generates an airflow in the HVAC system 34. The air baffles are electrically actuated surfaces within the HVAC system 34 which are used to direct the airflow within the HVAC system 34. By moving the air baffles, the HVAC system 34 may control a proportion of a total volume of the airflow generated by the blower which is directed to each of the HVAC outlets. The temperature control allows the HVAC system 34 to control a temperature of the airflow in the entire HVAC system 34. The HVAC outlets provide the airflow to the interior cabin of the vehicle 12. In an exemplary embodiment, the HVAC outlets are configured to provide airflow to occupants of the vehicle 12 to improve occupant comfort. The HVAC system 34 is in electrical communication with the controller 14 as described above. One or more operating parameters (e.g., an activation state, a blower speed, an airflow temperature, an enabled HVAC outlet, and/or the like) of the HVAC system 34 may be controlled by the controller 14, or in response to an input by an occupant of the vehicle 12 to HID of the infotainment system 32, as discussed above.

The seat massage system 36 is used to increase occupant comfort. In an exemplary embodiment, the seat massage system 36 includes one or more massage actuators disposed within one or more seats of the vehicle. In a non-limiting example, the one or more massage actuators are electromechanical actuators operable to provide vibration, massaging, heating, and/or the like. In a non-limiting example, the massage actuators are disposed within a seatback of the seat and arranged such as to provide manual stimulation to back muscles of the occupant during operation. In a non-limiting example, the massage actuators are disposed within a seat, armrest, and/or the like. In an exemplary embodiment, the seat massage system 36 is controllable by the occupant via the infotainment system 32, for example, by interaction with the HID, as discussed above. Furthermore, the controller 14 may adjust one or more operating parameters (e.g., an activation state, a massage intensity, a massage temperature, and/or the like) of the seat massage system 36 via electrical communication, as will be discussed in greater detail below.

The interior aroma system 38 is used to increase occupant comfort. In an exemplary embodiment, the interior aroma system 38 includes one or more aroma dispensers disposed within the vehicle 12. In a non-limiting example, the one or more aroma dispensers are electromechanical devices operable to aerosolize a scent liquid (e.g., an essential oil, a perfume, an air freshener, and/or the like). In a non-limiting example, the one or more aroma dispensers are distributed throughout the vehicle 12 to allow for even distribution of the aerosolized scent liquid. In another non-limiting example, the one or more aroma dispensers are integrated with the HVAC system 34, for example, by injecting the aerosolized scent liquid into the airflow directed to one or more of the HVAC outlets. In an exemplary embodiment, the interior aroma system 38 is controllable by the occupant via the infotainment system 32, for example, by interaction with the HID, as discussed above. Furthermore, the controller 14 may adjust one or more operating parameters (e.g., an activation state, a scent intensity, a scent choice, and/or the like) of the interior aroma system 38 via electrical communication, as will be discussed in greater detail below.

Figure 2:
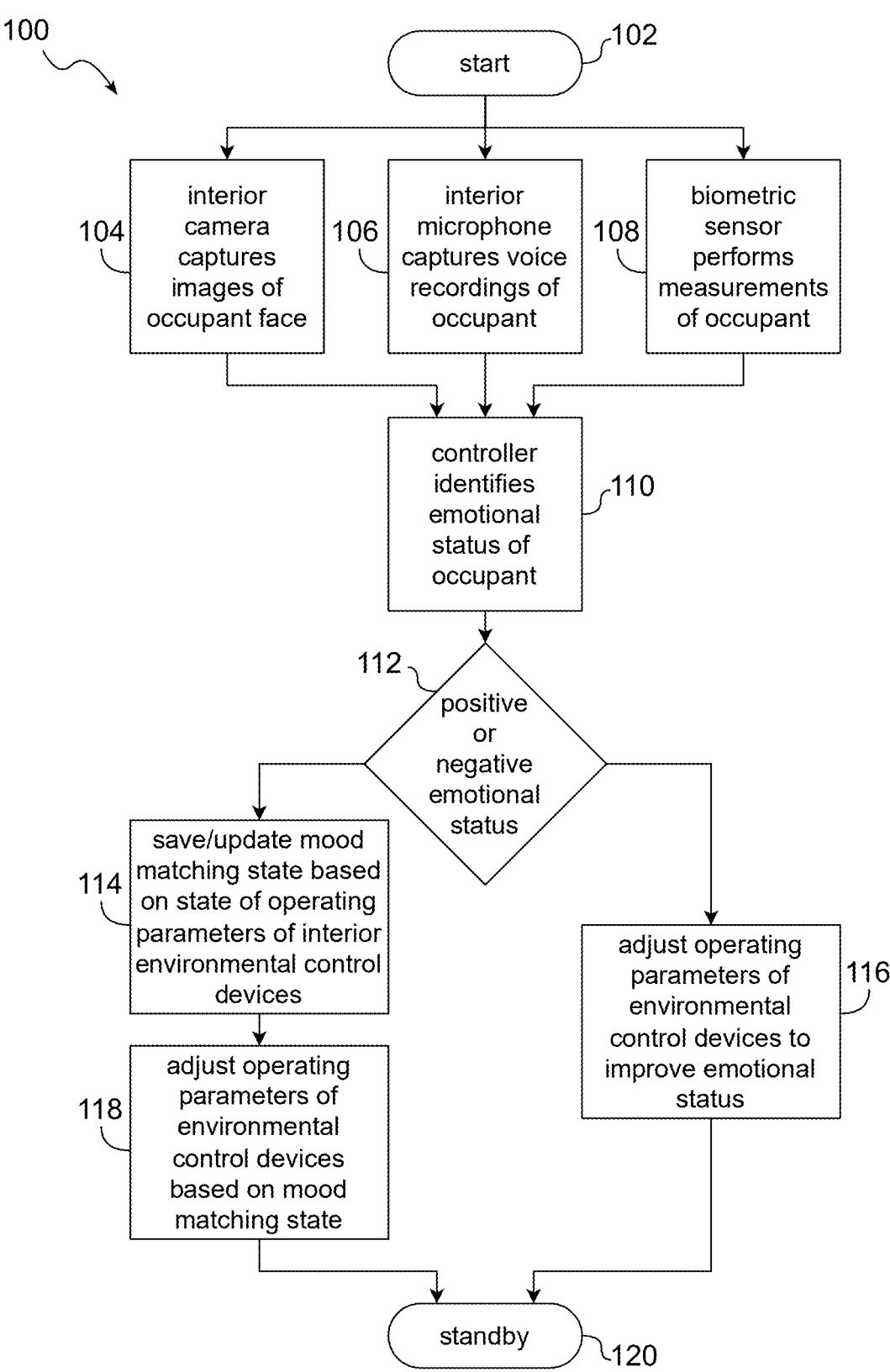
FIG. 2 is a flowchart of a method for interior personalization for a vehicle, according to an exemplary embodiment.

Referring to FIG. 2, a flowchart of the method 100 for interior personalization for a vehicle is shown. The method 100 begins at block 102 and proceeds to blocks 104, 106, and 108. At block 104, the controller 14 uses the interior camera 24 to capture one or more images of the face of the occupant. In an exemplary embodiment, the one or more images of the face of the occupant will be used to identify an emotional status of the occupant based on facial expression, as will be discussed in greater detail below. After block 104, the method 100 proceeds to block 110, as will be discussed in greater detail below.

At block 106, the controller 14 uses the interior microphone 26 to capture one or more voice recordings of the occupant. In an exemplary embodiment, the one or more voice recordings of the occupant will be used to identify an emotional status of the occupant based on word choice, pitch, intonation, speaking volume, and/or the like, as will be discussed in greater detail below. After block 106, the method 100 proceeds to block 110, as will be discussed in greater detail below.

At block 108, the controller 14 uses the biometric sensor 28 to perform one or more biometric measurements of the occupant. In an exemplary embodiment, the biometric measurements include, for example, respiration rate, heart rate, galvanic skin response, blood oxygen, body temperature, pupil dilation, brain activity, and/or the like. In an exemplary embodiment, the one or more biometric measurements of the occupant will be used to identify an emotional status of the occupant, as discussed above and as will be discussed in greater detail below. After block 108, the method 100 proceeds to block 110.

At block 110, the controller 14 identifies the emotional status of the occupant. In the scope of the present disclosure, the emotional status of the occupant includes one of: a negative occupant emotional status (e.g., sad, angry, anxious, stressed, and/or the like) and a positive occupant emotional status (e.g., happy, relaxed, excited, and/or the like). In an exemplary embodiment, to identify the emotional status of the occupant, the controller 14 executes an emotion identification machine learning algorithm.

In a non-limiting example, the emotion identification machine learning algorithm includes multiple layers, including an input layer and an output layer, as well as one or more hidden layers. The input layer receives the one or more images, the one or more voice recordings, and the one or more biometric measurements as inputs. The inputs are then passed on to the hidden layers. Each hidden layer applies a transformation (e.g., a non-linear transformation) to the data and passes the result to the next hidden layer until the final hidden layer. The output layer produces the emotional status of the occupant.

To train the emotion identification machine learning algorithm, a dataset of inputs and their corresponding emotional status of the occupant is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the emotion identification machine learning algorithm, the algorithm is capable of accurately and precisely determining emotional status of the occupant based on the one or more images, the one or more voice recordings, and the one or more biometric measurements. By adjusting the weights between the nodes in each hidden layer during training, the algorithm "learns" to recognize patterns in the data (e.g., facial expressions, vocal intonations, biometric measurements, and/or the like) that are indicative of the emotional status of the occupant. After block 110, the method 100 proceeds to block 112.

At block 112, if the emotional status of the occupant determined at block 110 is the positive occupant emotional status, the method 100 proceeds to block 114. If the emotional status of the occupant determined at block 110 is the negative occupant emotional status, the method 100 proceeds to block 116, as will be discussed in greater detail below.

At block 114, the controller 14 determines a current state of the one or more operating parameters of one or more of the vehicle interior environmental control devices 18. It should be understood that the one or more operating parameters may include any of the operating parameters discussed above in relation to any of the one or more of the vehicle interior environmental control devices 18. The controller 14 saves a mood matching state of the one or more operating parameters of one or more of the vehicle interior environmental control devices 18 in the media 22 of the controller 14. The mood matching state is equal to the current state of the one or more operating parameters of one or more of the vehicle interior environmental control devices 18.

In an exemplary embodiment, upon subsequent executions of the method 100, the mood matching state is updated by averaging the mood matching state with the current state. For example, if a mood matching state previously saved in the media 22 includes an HVAC system 34 blower speed of ten and the current state includes an HVAC system 34 blower speed of eight, the mood matching state saved in the media 22 may be updated to include an HVAC system 34 blower speed of nine.

In another exemplary embodiment, the controller 14 utilizes a mood matching machine learning algorithm to determine the optimal mood matching state. By repeatedly observing the current state when the emotional state of the occupant is the positive occupant emotional state, the mood matching machine learning algorithm "learns" which state of the one or more operating parameters of one or more of the vehicle interior environmental control devices 18 corresponds with the positive occupant emotional status. It should be understood that any mathematical, statistical, and/or machine learning based method for reconciling differing operating parameters in the mood matching state upon subsequent executions of the method 100 is within the scope of the present disclosure. After block 114, the method 100 proceeds to block 118.

At block 118, the controller 14 adjusts the one or more operating parameters of one or more of the one or more vehicle interior environmental control devices 18 based at least in part on the mood matching state. In an exemplary embodiment, the controller 14 adjusts the activation state, the brightness, the color, the animation, and/or the location of illuminated light sources of the interior ambient lighting system 30 to correspond with the mood matching state. In an exemplary embodiment, the controller 14 adjusts the display brightness, the display color, the display notification, and/or the like of the HMI to correspond with the mood matching state.

In an exemplary embodiment, the controller 14 adjusts the music playback volume, the music playback genre, and/or the like of the sound system to correspond with the mood matching state. In an exemplary embodiment, the controller 14 adjusts the destination and/or route parameters of the navigation system to correspond with the mood matching state. In a non-limiting example, the controller 14 uses the HMI of the infotainment system 32 to suggest an alternate navigation route and/or navigation destination to the occupant. In an exemplary embodiment, the controller 14 adjusts the activation state, the blower speed, the airflow temperature, the enabled HVAC outlet, and/or the like of the HVAC system 34 to correspond with the mood matching state.

In an exemplary embodiment, the controller 14 adjusts the activation state, the massage intensity, the massage temperature, and/or the like of the seat massage system 36 to correspond with the mood matching state. In an exemplary embodiment, the controller 14 adjusts the activation state, the scent intensity, the scent choice, and/or the like of the interior aroma system 38 to correspond with the mood matching state.

In an exemplary embodiment, before adjustment of the one or more operating parameters of one or more of the one or more vehicle interior environmental control devices 18, the controller 14 uses the HMI of the infotainment system 32 to provide a notification to the occupant. In a non-limiting example, the notification includes a prompt requiring the occupant to provide consent using the HID to adjust the one or more operating parameters of one or more of the one or more vehicle interior environmental control devices 18. After block 118, the method 100 proceeds to enter the standby state at block 120.

At block 116, the controller 14 adjusts the one or more operating parameters of one or more of the one or more vehicle interior environmental control devices 18 to improve the emotional status of the occupant. In the scope of the present disclosure, improving the emotional status of the occupant means changing the emotional status of the occupant from the negative occupant emotional status to the positive occupant emotional status. In an exemplary embodiment, the controller 14 adjusts the activation state, the brightness, the color, the animation, and/or the location of illuminated light sources of the interior ambient lighting system 30 to improve the emotional status of the occupant. In a non-limiting example, the controller 14 uses the interior ambient lighting system 30 to provide cool colors in the blue spectrum, such as, for example, blue, purple, violet, green, and/or the like to invoke a feeling of calmness in the occupant. In an exemplary embodiment, the controller 14 adjusts the display brightness, the display color, the display notification, and/or the like of the HMI to improve the emotional status of the occupant. In a non-limiting example, the controller 14 uses the HMI to provide a notification to the occupant suggesting that the occupant take a break from driving. In a non-limiting example, the controller 14 uses the HMI to provide a notification to a driver about an emotional status of one or more other occupants of the vehicle 12.

In an exemplary embodiment, the controller 14 adjusts the music playback volume, the music playback genre, and/or the like of the sound system to improve the emotional status of the occupant. In a non-limiting example, the controller 14 uses the sound system to suggest calming sounds and/or music for playback. In a non-limiting example, the controller 14 uses the sound system to play commonly played music (e.g., favorite songs) of the occupant.

In an exemplary embodiment, the controller 14 adjusts the destination and/or route parameters of the navigation system to improve the emotional status of the occupant. In a non-limiting example, the controller 14 uses the HMI of the infotainment system 32 to suggest an alternate navigation route and/or navigation destination to the occupant. In a non-limiting example, the controller 14 adjusts a navigation system selected route to include a route with less traffic congestion, a less stressful driving maneuvers, more scenic surroundings, and/or the like. In a non-limiting example, the controller 14 uses the navigation system adjust a navigation system selected destination to a destination including, for example, a coffee shop, a spa, a masseuse, and/or the like.

In an exemplary embodiment, the controller 14 adjusts the activation state, the blower speed, the airflow temperature, the enabled HVAC outlet, and/or the like of the HVAC system 34 to improve the emotional status of the occupant. In a non-limiting example, the controller 14 uses the HVAC system 34 to decrease a temperature setpoint within the vehicle 12 in response to determining that the occupant is stressed. In a non-limiting example, the controller 14 uses the HVAC system 34 to increase a temperature setpoint within the vehicle 12 in response to determining that the occupant is drowsy.

In an exemplary embodiment, the controller 14 adjusts the activation state, the massage intensity, the massage temperature, and/or the like of the seat massage system 36 to improve the emotional status of the occupant. In a non-limiting example, the controller 14 uses the seat massage system 36 to provide a back massage to the occupant to decrease stress. In a non-limiting example, the controller 14 uses the seat massage system 36 to activate an anti-fatigue feature of the seat massage system 36 to keep the occupant alert. In a non-limiting example, the controller 14 adjusts an ergonomic position of the vehicle seat to improve the emotional status of the occupant.

In an exemplary embodiment, the controller 14 adjusts the activation state, the scent intensity, the scent choice, and/or the like of the interior aroma system 38 to improve the emotional status of the occupant.

In an exemplary embodiment, before adjustment of the one or more operating parameters of one or more of the one or more vehicle interior environmental control devices 18, the controller 14 uses the HMI of the infotainment system 32 to provide a notification to the occupant. In a non-limiting example, the notification includes a prompt requiring the occupant to provide consent using the HID to adjust the one or more operating parameters of one or more of the one or more vehicle interior environmental control devices 18. After block 116, the method 100 proceeds to enter the standby state at block 120.

In an exemplary embodiment, the controller 14 repeatedly exits the standby state 120 and restarts the method 100 at block 102. In a non-limiting example, the controller 14 exits the standby state 120 and restarts the method 100 on a timer, for example, every three hundred milliseconds.

The system 10 and method 100 of the present disclosure offer several advantages. By performing mood matching, the system 10 and the method 100 may be used to enhance the positive occupant emotional status by adjusting the one or more operating parameters of one or more of the one or more vehicle interior environmental control devices 18 based on the calculated and/or learned mood matching state. Furthermore, the system 10 and method 100 may be used to improve the emotional status of the occupant. Improving the emotional status of the occupant may reduce the risk of motor vehicle accidents. Additionally, the system 10 and method 100 may be used in scenarios with multiple occupants, including, for example, ride sharing scenarios. For example, the system 10 and the method 100 may be used to identify the emotional status of each of a plurality of occupants of the vehicle 12 and adjust the one or more operating parameters of one or more of the one or more vehicle interior environmental control devices 18 to improve the emotional status of each of the plurality of occupants.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for interior personalization for a vehicle, the system comprising:
 one or more vehicle sensors;
 one or more vehicle interior environmental control devices;
 a controller in electrical communication with the one or more vehicle sensors and the one or more vehicle interior environmental control devices, wherein the controller is programmed to:
  perform one or more measurements using the one or more vehicle sensors;
  identify an emotional status of an occupant of the vehicle based at least in part on the one or more measurements, wherein the emotional status of the occupant includes one of: a negative occupant emotional status and a positive occupant emotional status;
  determine a current state of one or more operating parameters of the one or more vehicle interior environmental control devices in response to identifying the positive occupant emotional status;
  save a mood matching state of the one or more operating parameters of the one or more vehicle interior environmental control devices in a non-transitory memory of the controller, wherein the mood matching state is equal to the current state of the one or more operating parameters;

control the vehicle by adjusting the operation of the one or more vehicle interior environmental control devices based at least in part on the mood matching state in response to determining that the emotional status of the occupant is the positive occupant emotional status; and
 control the vehicle by adjusting the operation of the one or more vehicle interior environmental control devices to improve the emotional status of the occupant in response to determining that the emotional status of the occupant is the negative occupant emotional status.

2. The system of claim 1, wherein the one or more vehicle sensors include at least an interior camera, and wherein to perform the one or more measurements, the controller is further programmed to:
 capture one or more images of a face of the occupant using the interior camera.

3. The system of claim 2, wherein the one or more vehicle sensors includes at least an interior microphone, and wherein to perform the one or more measurements, the controller is further programmed to:
 capture one or more voice recordings of the occupant using the interior microphone.

4. The system of claim 3, wherein the one or more vehicle sensors includes at least a biometric sensor, and wherein to perform the one or more measurements, the controller is further programmed to:
 perform one or more biometric measurements of the occupant using the biometric sensor, wherein the biometric sensor includes at least one of: a respiration rate sensor, a heart rate sensor, and a galvanic skin response sensor.

5. The system of claim 4, wherein to identify the emotional status of the occupant, the controller is further programmed to:
 execute an emotion identification machine learning algorithm, wherein the emotion identification machine learning algorithm is configured to receive the one or more images, the one or more voice recordings, and the one or more biometric measurements as an input and provide the emotional status of the occupant as an output.

6. The system of claim 5, wherein the one or more vehicle interior environmental control devices further includes an interior ambient lighting system, and wherein to adjust the one or more operating parameters, the controller is further programmed to:
 adjust one or more operating parameters of the interior ambient lighting system to improve the emotional status of the occupant in response to determining that the emotional status of the occupant is the negative occupant emotional status; and
 adjust one or more operating parameters of the interior ambient lighting system based at least in part on the mood matching state to match the emotional status of the occupant in response to determining that the emotional status of the occupant is the positive occupant emotional status.

7. The system of claim 5, wherein the one or more vehicle interior environmental control devices further includes an infotainment system, and wherein to adjust the one or more operating parameters, the controller is further programmed to:
 adjust one or more operating parameters of the infotainment system to improve the emotional status of the occupant in response to determining that the emotional status of the occupant is the negative occupant emotional status, wherein the one or more operating parameters of the infotainment system includes at least one of: a music playback volume and a music playback genre; and adjust one or more operating parameters of the infotainment system based at least in part on the mood matching state to match the emotional status of the occupant in response to determining that the emotional status of the occupant is the positive occupant emotional status.

8. The system of claim 7, wherein to adjust the one or more operating parameters, the controller is further programmed to:

adjust one or more operating parameters of the infotainment system to improve the emotional status of the occupant in response to determining that the emotional status of the occupant is the negative occupant emotional status, wherein the one or more operating parameters of the infotainment system includes at least one of: a navigation system selected route and a navigation system selected destination.

9. The system of claim 5, wherein to adjust the one or more operating parameters, the controller is further programmed to:

adjust one or more operating parameters of at least one of: a heating, ventilation, and air conditioning (HVAC) system, a seat massage system, and an interior aroma system to improve the emotional status of the occupant in response to determining that the emotional status of the occupant is the negative occupant emotional status; and adjust one or more operating parameters of the HVAC system, the seat massage system, and the interior aroma system based at least in part on the mood matching state to match the emotional status of the occupant in response to determining that the emotional status of the occupant is the positive occupant emotional status.

10. A method for interior personalization for a vehicle, the method comprising:

performing one or more measurements using one or more vehicle sensors;

identifying an emotional status of an occupant of the vehicle based at least in part on the one or more measurements, wherein the emotional status of the occupant includes one of: a negative occupant emotional status and a positive occupant emotional status;

saving a mood matching state of one or more operating parameters of at least one of: an interior ambient lighting system, a heating, ventilation, and air conditioning (HVAC) system, a seat massage system, and an interior aroma system in response to identifying the positive occupant emotional status, wherein the mood matching state is equal to a current state of the one or more operating parameters; and controlling the vehicle by adjusting the operation of at least one of: an interior ambient lighting system, a heating, ventilation, and air conditioning (HVAC) system, a seat massage system, and an interior aroma system based at least in part on the mood matching state in response to determining that the emotional status of the occupant is the positive occupant emotional status.

11. The method of claim 10, wherein performing the one or more measurements further comprises:

capturing one or more images of a face of the occupant using an interior camera;

capturing one or more voice recordings of the occupant using an interior microphone; and performing one or more biometric measurements of the occupant using a biometric sensor, wherein the biometric sensor includes at least one of: a respiration rate sensor, a heart rate sensor, and a galvanic skin response sensor.

12. The method of claim 11, wherein identifying the emotional status of the occupant further comprises:

executing an emotion identification machine learning algorithm, wherein the emotion identification machine learning algorithm is configured to receive the one or more images, the one or more voice recordings, and the one or more biometric measurements as an input and provide the emotional status of the occupant as an output, and wherein the emotional status of the occupant includes one of: a negative occupant emotional status and a positive occupant emotional status.

13. The method of claim 12, wherein adjusting the one or more operating parameters further comprises:

adjusting one or more operating parameters of an interior ambient lighting system to improve the emotional status of the occupant in response to determining that the emotional status of the occupant is the negative occupant emotional status; and adjusting one or more operating parameters of the interior ambient lighting system to be equal to the mood matching state in response to determining that the emotional status of the occupant is the positive occupant emotional status.

14. The method of claim 12, wherein adjusting the one or more operating parameters further comprises:

adjusting one or more operating parameters of an infotainment system to improve the emotional status of the occupant in response to determining that the emotional status of the occupant is the negative occupant emotional status, wherein the one or more operating parameters of the infotainment system includes at least one of: a music playback volume, a music playback genre, a navigation system selected route, and a navigation system selected destination; and adjusting one or more operating parameters of the infotainment system to be equal to the mood matching state in response to determining that the emotional status of the occupant is the positive occupant emotional status.

15. The method of claim 12, wherein adjusting the one or more operating parameters further comprises:

adjusting one or more operating parameters of at least one of: the heating, ventilation, and air conditioning (HVAC) system, the seat massage system, and the interior aroma system to improve the emotional status of the occupant in response to determining that the emotional status of the occupant is the negative occupant emotional status; and adjusting one or more operating parameters of the HVAC system, the seat massage system, and the interior aroma system to be equal to the mood matching state in response to determining that the emotional status of the occupant is the positive occupant emotional status.

16. A system for interior personalization for a vehicle, the system comprising:

one or more vehicle sensors, wherein the one or more vehicle sensors includes at least one of: an interior camera, an interior microphone, and a biometric sensor;

one or more vehicle interior environmental control devices, wherein the one or more vehicle interior environmental control devices includes at least one of: an interior ambient lighting system, a heating, ventilation, and air conditioning (HVAC) system, a seat massage system, and an interior aroma system;

a controller in electrical communication with the one or more vehicle sensors and the one or more vehicle interior environmental control devices, wherein the controller is programmed to:

perform one or more measurements using the one or more vehicle sensors, wherein the one or more measurements includes at least one of: one or more images of a face of an occupant, one or more voice recordings of the occupant, and one or more biometric measurements of the occupant;

execute an emotion identification machine learning algorithm, wherein the emotion identification machine learning algorithm is configured to receive the one or more images, the one or more voice recordings, and the one or more biometric measurements as an input and provide an emotional status of the occupant as an output, and wherein the emotional status of the occupant includes one of: a negative occupant emotional status and a positive occupant emotional status; and control the vehicle by adjusting the operation of the one or more vehicle interior environmental control devices to correspond with a mood matching state in response to identifying the positive occupant emotional status, wherein the mood matching state is determined by repeated observation of a current state of one or more operating parameters of the one or more vehicle interior environmental control devices when the emotional status of the occupant is the positive occupant emotional status.

17. The system of claim 16, wherein the controller is further programmed to:

identify the positive occupant emotional status based on the one or more measurements using the emotion identification machine learning algorithm;

determine the current state of the one or more operating parameters of the one or more vehicle interior environmental control devices in response to identifying the positive occupant emotional status; and save the mood matching state of the one or more operating parameters of the one or more vehicle interior environmental control devices in a non-transitory memory of the controller, wherein the mood matching state is equal to the current state of the one or more operating parameters.

18. The system of claim 17, wherein the controller is further programmed to:

adjust the one or more operating parameters of the one or more vehicle interior environmental control devices to improve the emotional status of the occupant in response to determining that the emotional status of the occupant is the negative occupant emotional status.

* * * * *